United States Patent
Anderson et al.

(10) Patent No.: US 6,985,206 B2
(45) Date of Patent: Jan. 10, 2006

(54) BASEBALL PITCH SPEED MEASUREMENT AND STRIKE ZONE DETECTION DEVICES

(76) Inventors: James R. Anderson, 211 W. Sidney, St. Paul, MN (US) 55107; Charles Regan, 1797 Carroll Ave., St. Paul, MN (US) 55104

( * ) Notice: Subject to any disclaimer, the term of this patent is extended or adjusted under 35 U.S.C. 154(b) by 207 days.

(21) Appl. No.: 10/452,532

(22) Filed: Jun. 2, 2003

(65) Prior Publication Data

US 2004/0239915 A1 Dec. 2, 2004

(51) Int. Cl.
*G01P 3/25* (2006.01)
*F41J 5/02* (2006.01)

(52) U.S. Cl. .......................... 352/28; 273/371
(58) Field of Classification Search ............ 356/28; 273/317, 371; 473/131, 192
See application file for complete search history.

(56) References Cited

U.S. PATENT DOCUMENTS

| | | | | |
|---|---|---|---|---|
| 3,025,406 A | * | 3/1962 | Stewart et al. | 250/222.1 |
| 3,619,630 A | * | 11/1971 | McLeod et al. | 250/222.1 |
| 4,097,800 A | * | 6/1978 | Kuchmas et al. | 324/178 |
| 4,180,726 A | | 12/1979 | DeCrescent | |
| 4,347,438 A | * | 8/1982 | Spielman | 250/221 |
| 4,545,576 A | | 10/1985 | Harris | |
| 4,563,005 A | * | 1/1986 | Hand et al. | 473/455 |
| 4,652,121 A | | 3/1987 | Ito et al. | |
| 4,770,527 A | | 9/1988 | Park | |
| 4,959,807 A | | 9/1990 | Thomspon et al. | |
| 4,961,643 A | | 10/1990 | Sakai et al. | |
| 5,230,505 A | | 7/1993 | Paquet et al. | |
| 5,401,016 A | | 3/1995 | Heglund et al. | |
| 5,481,355 A | | 1/1996 | Iijima et al. | |
| 5,509,649 A | | 4/1996 | Buhrkuhl | |
| 5,512,998 A | | 4/1996 | Pushell | |
| 5,568,250 A | | 10/1996 | Nishiyama et al. | |
| 5,602,638 A | | 2/1997 | Boulware | |
| 5,676,607 A | | 10/1997 | Stumpf | |
| 5,820,496 A | | 10/1998 | Bergeron | |
| 6,020,594 A | * | 2/2000 | Tschudi | 250/559.32 |
| 6,188,469 B1 | | 2/2001 | Liou et al. | |
| 6,358,164 B1 | | 3/2002 | Bracewell et al. | |
| 6,414,747 B1 | | 7/2002 | Hardy | |

OTHER PUBLICATIONS

Stalker The Worlds Most Advanced Radar Guns Featuring Digital Signal Processing, Oct. 14, 2002, http://www.radarsales.com/stalkers.htm , 5 pages.

* cited by examiner

*Primary Examiner*—Thomas H. Tarcza
*Assistant Examiner*—Isam Alsomiri
(74) *Attorney, Agent, or Firm*—Crompton, Seager & Tufte LLC

(57) ABSTRACT

Apparatus and methods for detecting the speed and/or location of a moving object within a target area are disclosed. A pitch speed measurement and strike zone detection apparatus in accordance with an exemplary embodiment of the present invention may include a support frame configured to support a pair of reflective surfaces on either side of a target area. A light source and receiver configured to direct a light beam back and forth between the reflective surfaces can be used to form a light curtain that detects when an object passes through a particular location within the target area. Multiple light sources and receivers may be employed to measure the speed of the object, and to determine whether the object passes through a particular strike zone. The device may include an adjustment mechanism and self-alignment laser to reposition the reflective surfaces, as necessary.

38 Claims, 8 Drawing Sheets

US 6,985,206 B2

BASEBALL PITCH SPEED MEASUREMENT AND STRIKE ZONE DETECTION DEVICES

FIELD OF THE INVENTION

The present invention relates generally to devices for measuring and detecting the speed of a moving object within a target area. More specifically, the present invention relates to devices for determining the velocity and location of a baseball or other thrown object impelled by a player.

BACKGROUND OF THE INVENTION

Measurement and detections devices are utilized to determine the parameters of a pitched object as it passes through a target area. In baseball, for example, such devices can be useful to determine the precise speed of the baseball as it passes by home plate, or to detect whether the baseball falls within a particular strike zone, resulting in either a "strike" or "ball" call. Such parameters can be particularly useful as a training aid to improve the pitching performance in real-time, providing the pitcher with instant feedback on the precise speed and location of the thrown object.

To determine the speed and location of the thrown object, many conventional systems employ several cameras, light beams, sensors, or other detector elements in an array to define a target area (e.g. a strike zone) within one or more planes. Such designs, while useful in measuring parameters such as velocity or position, often require numerous detection devices to measure the object, adding to the complexity and cost of the device. Many such designs are also reliant on a fixed support means such as a frame or arch to detect and/or measure the parameter(s) of the object, with no accompanying means for calibrating the detector elements. After repeated use, the frame or arch may become misaligned, resulting in aberrant readings from the attached detector elements. As a result, the device may produce an incorrect reading of the velocity or position of the object. It is therefore desirable to have a simplified device capable of determining the velocity and location of a thrown object with means to calibrate the device during use.

SUMMARY OF THE INVENTION

The present invention relates generally to devices for measuring and detecting the speed of a moving object within a target area. A pitch speed measurement and strike zone detection device in accordance with an exemplary embodiment of the present invention may include a framed structure configured to adjustably support a pair of reflective surfaces on either side of a target area defined by home plate. A first light source operatively coupled to one of the reflective surfaces may be configured to form a front light curtain that detects when an object passes through the vertical plane defined by the front portion of home plate. A second light source operatively coupled to one of the reflective surfaces may be configured to form a rear light curtain that detects when the object passes through the vertical plane defined by the rear portion of home plate. A measure of the velocity of the object can be then determined by calculating the differential time required for the object to trigger the front and rear light curtains, and then computing the velocity using the known distance between the two light sources.

Additional light sources may be employed to form various light curtains that can be used detect when the object passes within a particular strike zone. In certain embodiments, for example, a third and second light source may be employed to form a horizontal and vertical light curtain, which, during operation, can be used to determine whether the thrown object is a "ball" or "strike". The light sources may be adjustably mounted to the device to permit adjustment of the vertical and/or horizontal boundaries of the strike zone. In certain embodiments, the additional light sources may be configured to measure the precise location of the object as it passes through the target area.

The pitch speed measurement and strike zone detection device may also include a self-alignment laser to calibrate and adjust the reflective surfaces, as necessary. The self-alignment laser may be coupled to one of the reflective surfaces, and may be configured to direct a light beam at the opposite reflective surface to ascertain whether the reflective surfaces are aligned parallel to each other. The light beam reflected back from the opposite reflective surface is then analyzed to determine whether alignment of the reflective surfaces is necessary. In certain exemplary embodiments, an array of photodiodes or other suitable photosensitive elements may be employed to measure when the reflective surfaces become misaligned, sending a signal to a controller to adjust one or both of the reflective surfaces.

DETAILED DESCRIPTION OF THE INVENTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
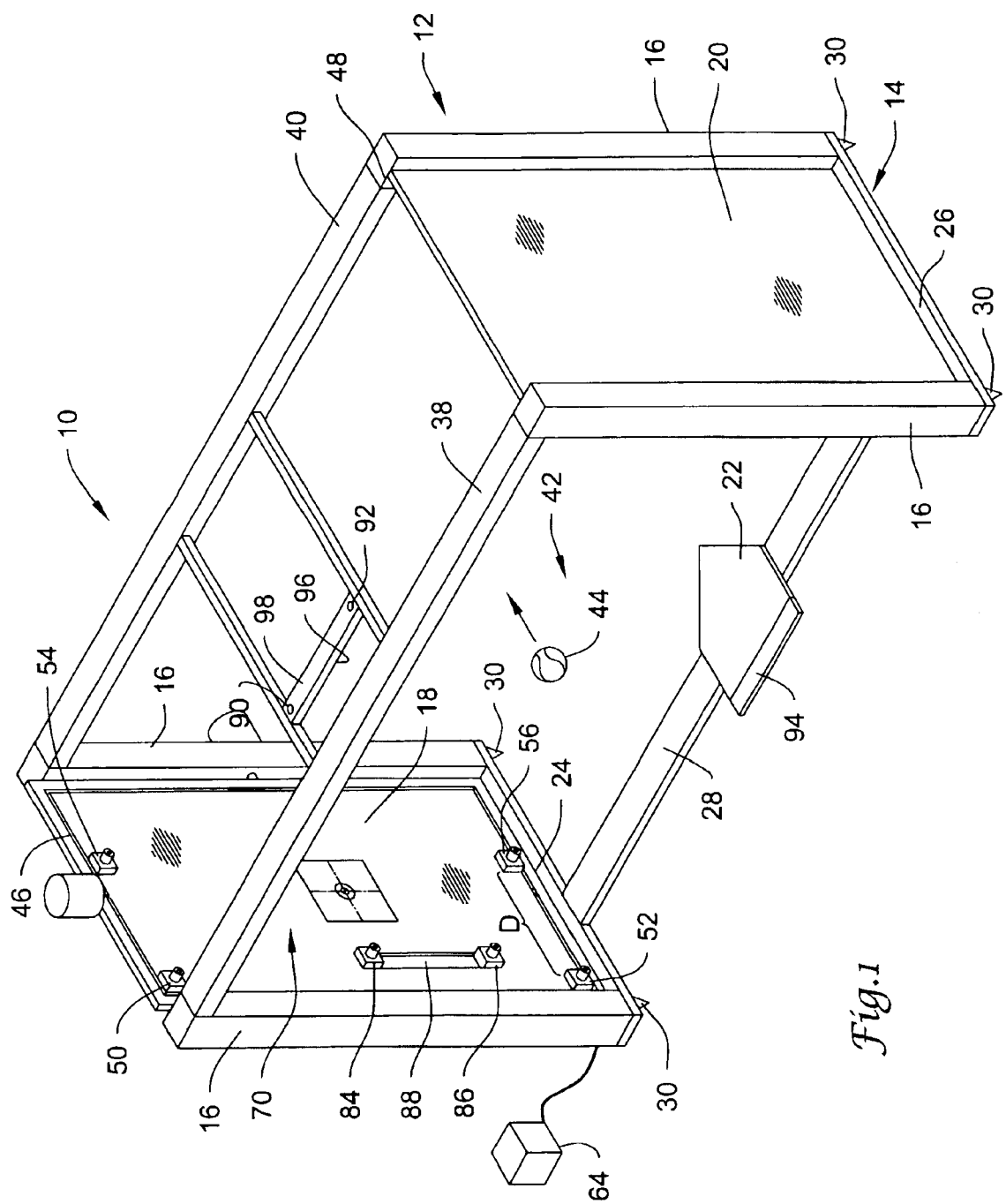
FIG. 1 is a perspective view of a pitch speed measurement and strike zone detection device in accordance with an exemplary embodiment of the present invention.

FIG. 1 is a perspective view of a pitch speed measurement and strike zone detection device 10 in accordance with an exemplary embodiment of the present invention. Device 10 includes a support frame 12 comprising a base structure 14 and several vertical uprights 16 adapted to support a pair of reflective surfaces 18,20 spaced apart from each other on either side of home plate 22. Base structure 14 includes a first base support member 24 located adjacent and to the left of home plate 22, a second base support member 26 located adjacent and to the right of home plate 22, and a cross support member 28 that connects home plate 22 to the first and second base support members 24,26.

The dimensions of the support frame 12 may vary depending on the particular game simulated, and the specific location the device 10 is to be installed. In certain embodiments, for example, the dimensions of the support frame 12 can be scaled down to permit the device 10 to fit within a room or hallway for indoor use. In other embodiments, the dimensions of the support frame 12 can be increased in scale for outdoor use. In some embodiments, the first and second base support members 24,26 may each have a length of about 18 to 36 inches, and may be spaced apart from each other a distance of 60 to 130 inches.

The support frame 12 may be configured to lie immediately above the surface of the ground or floor, or, in the alternative, can be recessed into the ground such that the base support members 24,26 are recessed within or lie flush with the surface of the ground or floor. In the exemplary embodiment illustrated in FIG. 1, the support frame 12 is secured to the ground via several mounting spikes 30 extending below the first and second base support members 24,26. Other means to attach the support frame 12 to the surface may be employed, including, for example, poles, concrete or adhesive. In some embodiments, the device 10 may include a hook, clip or other suitable fastener that can be used to quickly attach or detach the device to the ground or floor.

Figure 2:
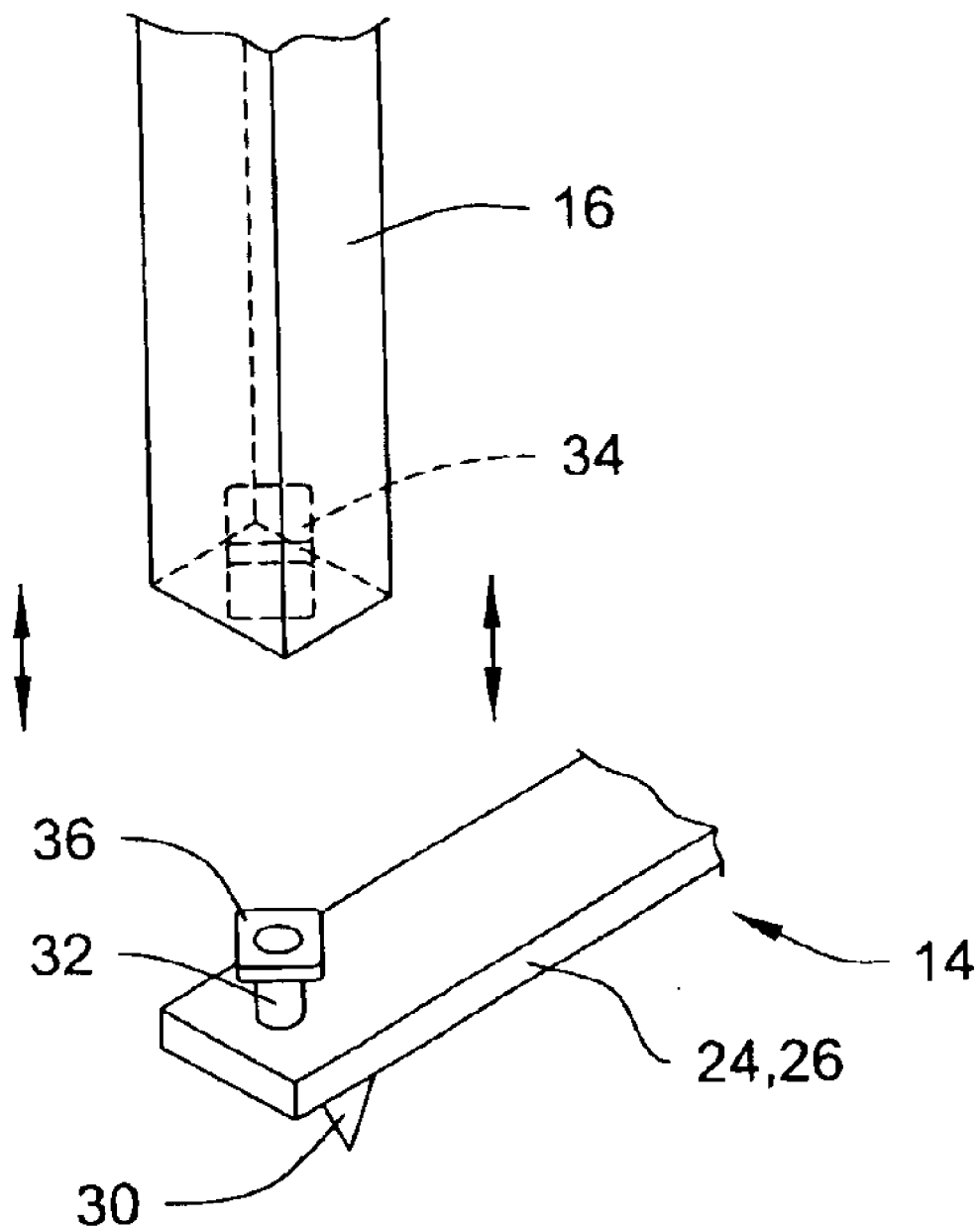
FIG. 2 is a perspective view showing the mounting post assembly used to connect the vertical uprights and base support members illustrated in FIG. 1.

The first and second support members 24,26 may also include means to quickly connect the vertical uprights 16 to the support frame 12. As shown in FIG. 2, for example, each base support member 24,26 may include a mounting post 32 configured to mate with a corresponding bore 34 on each of the vertical uprights 16. The mounting post 32 may include a protective cap 36 that can be inserted onto the end of the mounting post 32 and used to quickly secure the vertical uprights 16 to the base support members 24,26, as indicated by the arrows. The protective cap 36 may be rectangular in shape, and may have an outer diameter substantially similar to the inner diameter of the bore 34 to provide a friction fit therein. When inserted into the bore 34 of vertical upright 16, mounting post 32 rigidly secures the vertical upright 16 to the base structure 14.

Referring back to FIG. 1, it can be further seen that support frame 12 may also include several upper support members 38,40 that extend horizontally from the upper ends of each vertical upright 16. The upper support members 38,40 are configured to provide additional lateral support for the support frame 12, and may be utilized to support additional light detectors to detect the horizontal and/or vertical location of the thrown object as it passes through the plane of the strike zone, as described in greater detail below. When attached together, the vertical uprights 16, upper support members 38,40 and base structure 14 define an opening 42 through which a pitcher can throw an object 44 such as a baseball or softball.

The first reflective surface 18 of device 10 may be coupled to a frame 46 that supports the first reflective surface 18 in a vertically upright position to the left of home plate 22. The first reflective surface 18 may include a mirror or other reflective element configured to reflect light back and forth to and from a second reflective surface 20 supported by a second frame 48 in a vertically upright position to the right of home plate 22.

In certain embodiments, the first and second reflective surfaces 18,20 may be formed of Plexiglas or other suitable material to prevent damage resulting from transport or setup of the device 10, or from errantly thrown balls. The reflective surfaces 18,20 may also be recessed into the support frame 12 slightly to prevent damage from occurring.

A first light source 50 coupled to the first reflective surface 18 may be configured to emit a beam of light from the first reflective surface 18 back and forth towards the second reflective surface 20, where it is eventually received by a first receiver 52 on the first reflective surface 18. During operation, the first light source 50 and first receiver 52 form a front light curtain that detects when the thrown object enters the opening 42 proximal of home plate 22.

A second light source 54 coupled to the first reflective surface 18 a predetermined distance D from the first light source 50 may be configured to emit a second beam of light from the first reflective surface 18 back and forth towards the second reflective surface 20 until being eventually received by a second receiver 56 on the first reflective surface 18. In use, the second light source 54 and second receiver 56 form a rear light curtain that detects when the thrown object exits opening 42 distal of home plate 22.

The first and second light sources 50,52 may each comprise laser light sources configured to direct a relatively narrow laser beam back and forth between the reflective surfaces 18,20. The first and second receivers 52,56 may each be configured to detect when the presence or absence of light emanating, respectively, from the first and second light sources 50,52. In certain embodiments, the first and second receivers may include photodiodes, avalanche photodiodes (APD's), phototransistors, PIN diodes, photomultiplier tubes or other photosensitive devices configured to convert light transmitted from the light sources 50,54 into an electrical signal.

Figure 3:
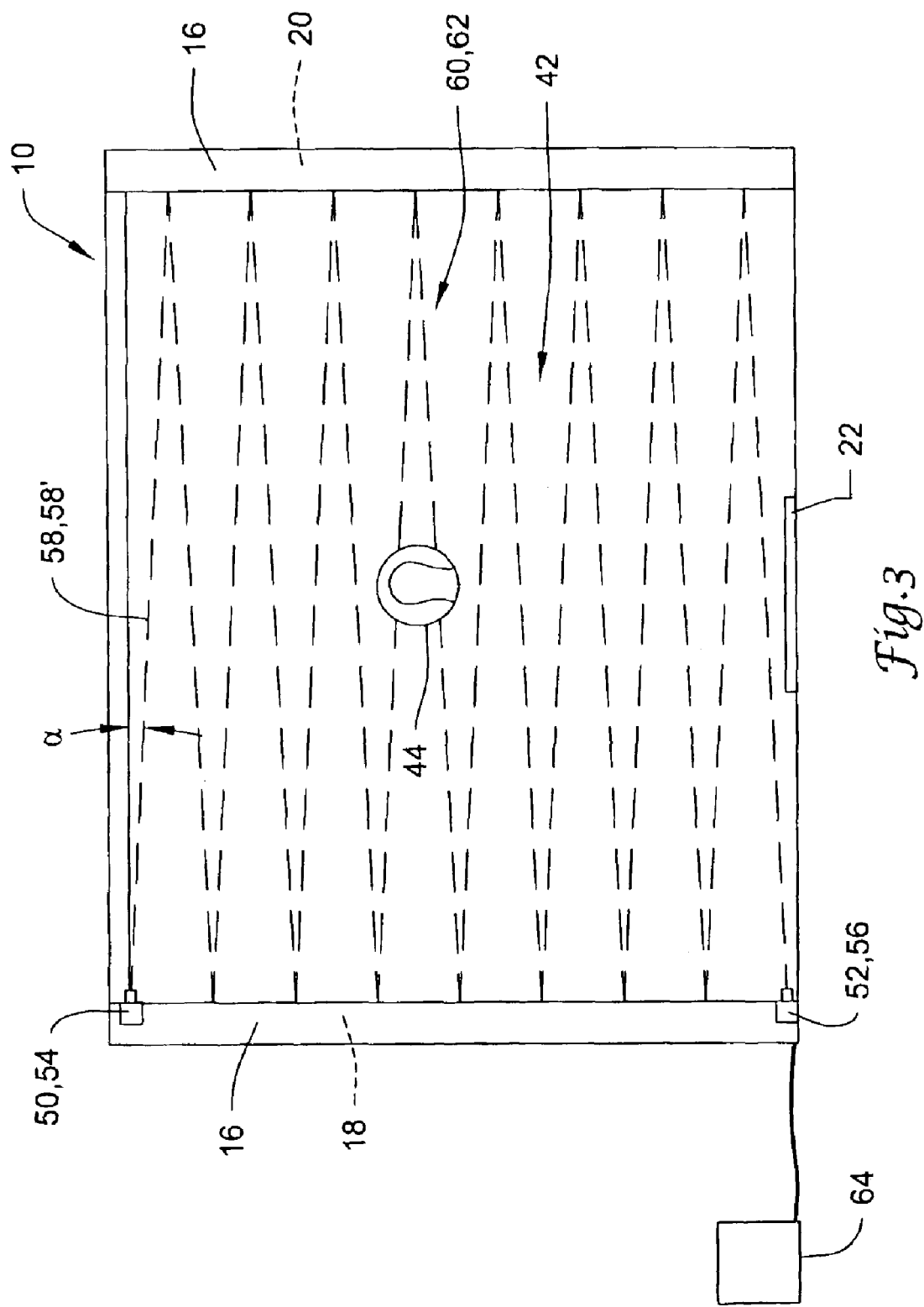
FIG. 3 is a front view of the pitch speed measurement and strike zone detection device of FIG. 1, showing the detection of an object passing through the light curtains.

FIG. 3 is a front-end view of device 10 showing the detection of object 44 as it passes through the first light source 50. As illustrated in FIG. 3, the first light source 50 is configured to direct a beam of light 58 from the first reflective surface 18 back and forth to and from the second reflective surface 20, forming a front laser curtain 60 that detects the presence of object 44 proximal of home plate 22, sending a signal to a programmable computer 64 or other logic device. The first light source 50 may be positioned to direct the light beam 58 at a slight downward angle a to ensure that the light beam 58 travels back and forth between the reflective surfaces a sufficient number of times such that object 44 intersects the light beam 58 at any location within the opening 42, both horizontally and vertically. The angle α necessary to ensure that light beam 58 will be interrupted as object 44 passes through front laser curtain 60 depends on several factors, including the size of the object 44, the distance between the first and second reflective surfaces 18,20, and the diameter of the light beam 58 emitted from the light source 50.

The second light source 54 may be configured similar to the first light source 50, forming a rear light curtain 62 that detects the presence of object 44 distal of home plate 22. Similar to the first light source 50, the second light source 54 may be configured to emit a second light beam 58' at a slight downward angle α, which is interrupted as the object 44 passes through the opening 42 distal home plate 22. For sake of clarity in FIG. 3, the second light beam 58' is shown directed at the same angle a as light beam 58. However, it should be understood that the particular angle may differ from the first light source 50.

Figure 4:
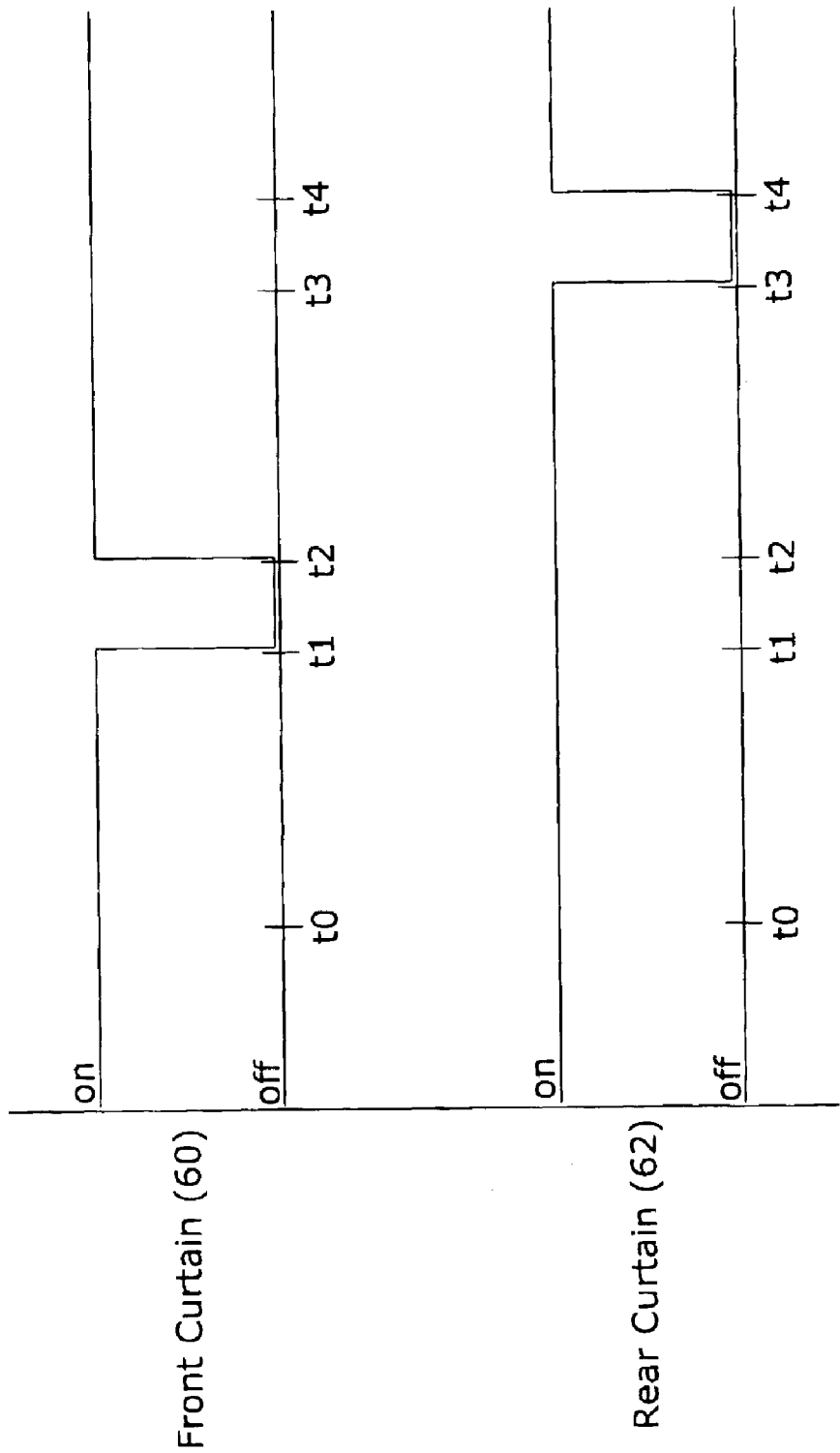
FIG. 4 is a pulse diagram illustrating the status of the front and rear light curtains as the object passes through the target area.

In one aspect of the present invention, the pitch speed of a thrown object can be determined by calculating the differential time it takes for the object to travel from the front light curtain 60 to the rear light curtain 62, and then computing the velocity using the known distance D between the two light curtains 60,62. As shown in the timing diagram of FIG. 4, the first and second light sources 50,54 are both normally closed at time $t_0$, corresponding to the time just prior to the object 44 passing through the first light curtain 60. As object 44 passes through the first light curtain 60, the signal received by the first receiver 52 is temporarily interrupted between time $t_1$ and $t_2$, resulting in an open signal. The recorded time $T_{R1}$ the object 44 passes through the first laser curtain 60, accounting for the different locations in which the object 44 can trip the circuit, can be determined using the following formula:

$$T_{R1} = t_2 + \frac{1}{2}(t_2 - t_1), \text{ where:}$$

$t_1$ is the time the circuit is opened, and $t_2$ is the time the circuit closes.

Continued forward motion of the object 44 triggers the second light curtain 62, causing the signal received by the second receiver 56 to be temporarily interrupted between times $t_3$ and $t_4$, resulting in an open signal. Similar to the first light curtain 60, the recorded time $T_{R2}$ the object 44 passes through the second light curtain 62 can be determined using the following formula:

$$T_{R2} = t_4 + \frac{1}{2}(t_4 - t_3), \text{ where:}$$

$T_3$ is the time the circuit is opened, and $T_4$ is the time the circuit closes.

Once the thrown object 44 has passed through both the first and second light curtains 60,62, a measure of the velocity can then be calculated using, for example, an external computer 64 or other suitable logic device which takes the known distance between each light curtain 60,62 and divides that value by the differential recorded time $(T_{R2} - T_{R1})$ it takes for the object 44 to trigger each light curtain 60,62. An accurate measure of the velocity of the thrown object 44 is thereby obtained as the object 44 passes across home plate 22.

In certain embodiments, device 10 may further include an adjustment mechanism to ensure that the first and second reflective surfaces 18,20 are continuously aligned parallel to each other. As shown in greater detail in FIG. 5, the first reflective surface 18 may include a vertical adjustment mechanism 66 to ensure that the first reflective surface 18 is aligned vertically with the second reflective surface 20, and a horizontal adjustment mechanism 68 to ensure that the first reflective surface 18 is aligned horizontally with the second reflective surface 20. In certain embodiments, the vertical and/or horizontal adjustment mechanisms 66,68 may each comprise a gear such as a worm gear configured to engage a set of teeth located on the frame 46. A rack and pinion or other suitable gearing mechanism may also be used to adjust the positioning, vertically and/or horizontally, as necessary.

Figure 5:
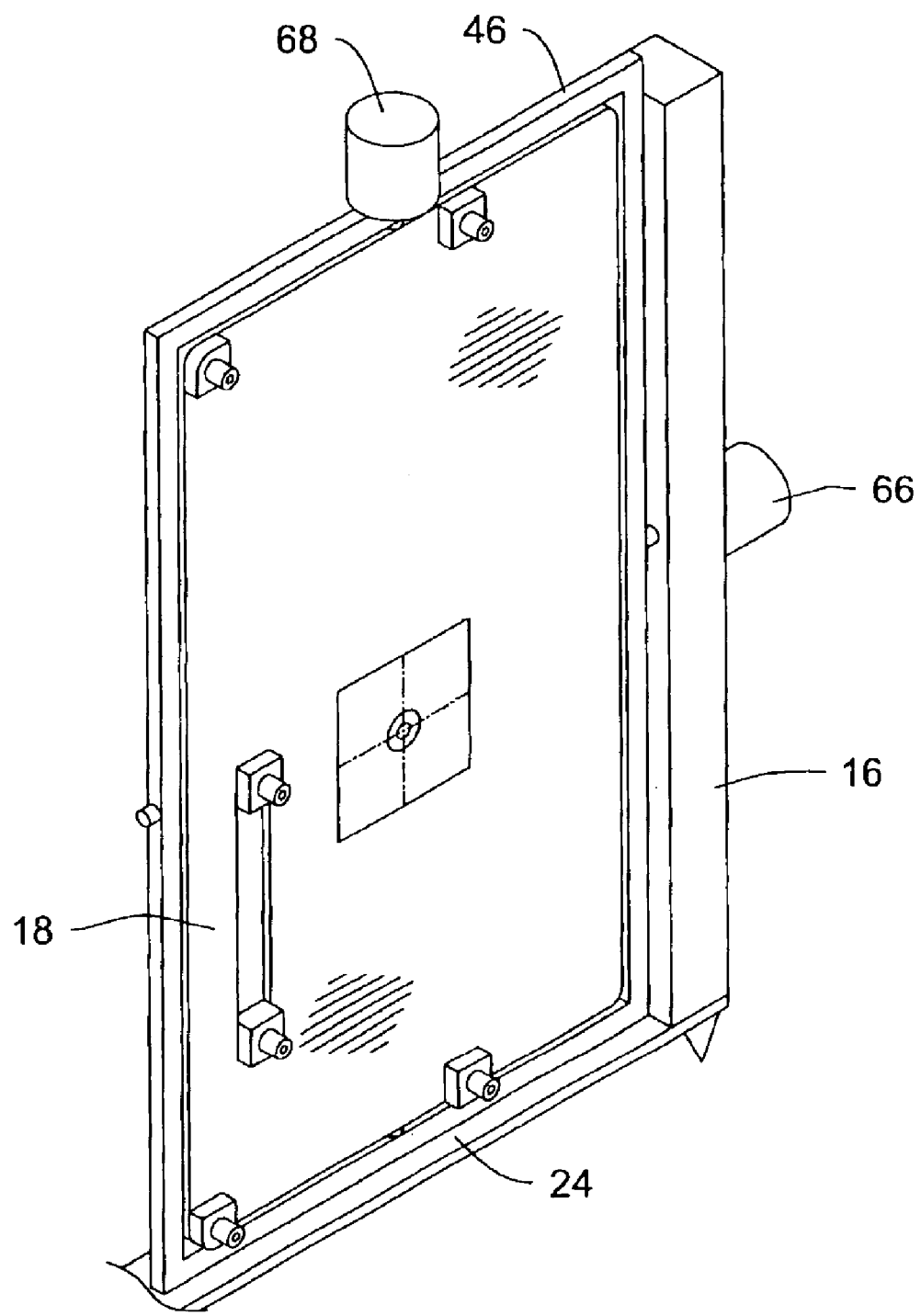
FIG. 5 is a perspective view of one of the reflective surfaces of FIG. 1, showing an exemplary adjustment mechanism used to align the device.

Although the exemplary embodiment illustrated in FIG. 5 illustrates a device 10 having an adjustment mechanism on only one of the reflective surfaces (i.e. the first reflective surface 18), it should be understood that either or both of the reflective surfaces 18,20 may employ an adjustment mechanism to continuously adjust the vertical and/or horizontal orientation of the surfaces. For example, the second reflective surface 20 may be adjustably coupled to frame 48, including a horizontal and/or vertical adjustment mechanism that can be used to adjust the second reflective surface 20 relative to the reflective surfaces 18,20.

Figure 6:
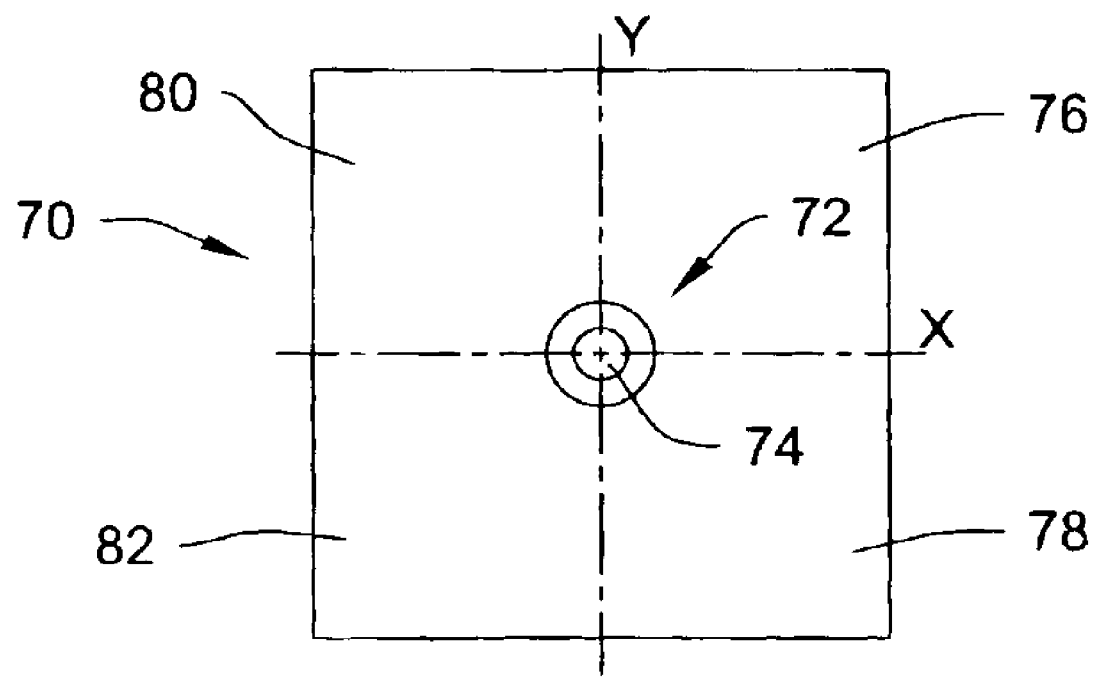
FIG. 6 is a front view of a self-alignment laser and detector element in accordance with an exemplary embodiment of the present invention.

Referring now to FIG. 6, a laser assembly 70 (see FIG. 1) mounted at or near the center of the first reflective surface 18 may include a self-alignment laser 72 configured to direct a laser beam 74 perpendicularly from the first reflective surface 18 towards the second reflective surface 20 to determine whether the reflective surfaces 18,20 are aligned parallel with each other. The self-alignment laser 72 may be mounted flush with the first reflective surface 18 such that laser beam 74 is emitted at a point along the surface of the first reflective surface 18.

Surrounding the self-alignment laser 72 are four photosensitive detectors 76,78,80,82, each located, respectively, in the four quadrants defined by the x and y coordinates of a Cartesian plane. The photosensitive detector elements 76,78,80,82 may each include one or more photodiodes, avalanche photodiodes (APD's), phototransistors, PIN diodes, photo-multiplier tubes or other photosensitive devices. The detector elements 76,78,80,82 may be configured to send a signal to a programmable computer 64 or other logic device when the reflected laser beam 74 is detected in a particular quadrant, indicating that the first and second reflective surfaces 18,20 are misaligned relative to each other. The programmable computer 64 may be configured to send a signal to the vertical and/or horizontal adjustment mechanisms 66,68 to realign the first and/or second reflective surfaces 18,20, as necessary, based on the information received from the four detector elements 76,78, 80,82.

In certain embodiments, device 10 may further include one or more additional light sources and receivers to determine whether the object 44 passes within a particular strike zone above home plate 22. As shown in FIG. 1, for example, device 10 may include a third light source 84 coupled to the first reflective surface 18 that directs a light beam (e.g. a laser beam) at a slight downward angle towards the second reflective surface 20, forming a third laser curtain that can be used to determine whether the thrown object 44 is above or below the strike zone. The emitted light beam from the third light source 84 is directed back and forth from the first reflective surface 18 to the second reflective surface 20 until it is eventually received by a third receiver 86 coupled to the first reflective surface 18 below the third light source 84. The third receiver 86 may be fixedly secured to the first reflective surface 18, or, as shown in FIG. 1, may be adjustably mounted to a vertical track 88, allowing the operator to enlarge or reduce the size of the light curtain, as desired. The third light source and receiver 84,86 may be offset a small distance from the first light source 50 and receiver 52 to prevent interference with the first light curtain 60.

To determine whether object 44 is to the left or right of the strike zone, device 10 may further include a fourth light source 90 and a fourth receiver 92, forming a fourth light curtain adjacent and behind the third light curtain. As shown in FIG. 1, for example, the fourth light source 90 can be coupled to the support frame 12 above home plate 22, and can be configured to emit a light beam in a downward direction towards a fourth reflective surface 96 on home plate 22. The fourth light source 90 can be directed at a slight angle to the right, causing the light beam to bounce back and force between a reflective surface 94 on the upper surface of home plate 22 and a reflective surface 96 on the underside of support member 98 until it is eventually received by the fourth receiver 92. As with the third light source 84 and receiver 86, the fourth light source 90 and receiver 92 may be offset a distance from the other light sources to prevent interference from occurring. As with the first and second reflective surfaces 18,20, reflective surface 94 and home plate 22 may be formed of Plexiglas or other protective material to prevent damage to the device 10 during use. In some embodiments, the fourth light 90 and/or fourth receiver 92 can be adjustably mounted to the support member 98 to allow the horizontal size of the light curtain to be enlarged or reduced, as desired. Additional light sources/receivers may also be employed to track the object 44 as it passes across home plate 22.

Figure 7:
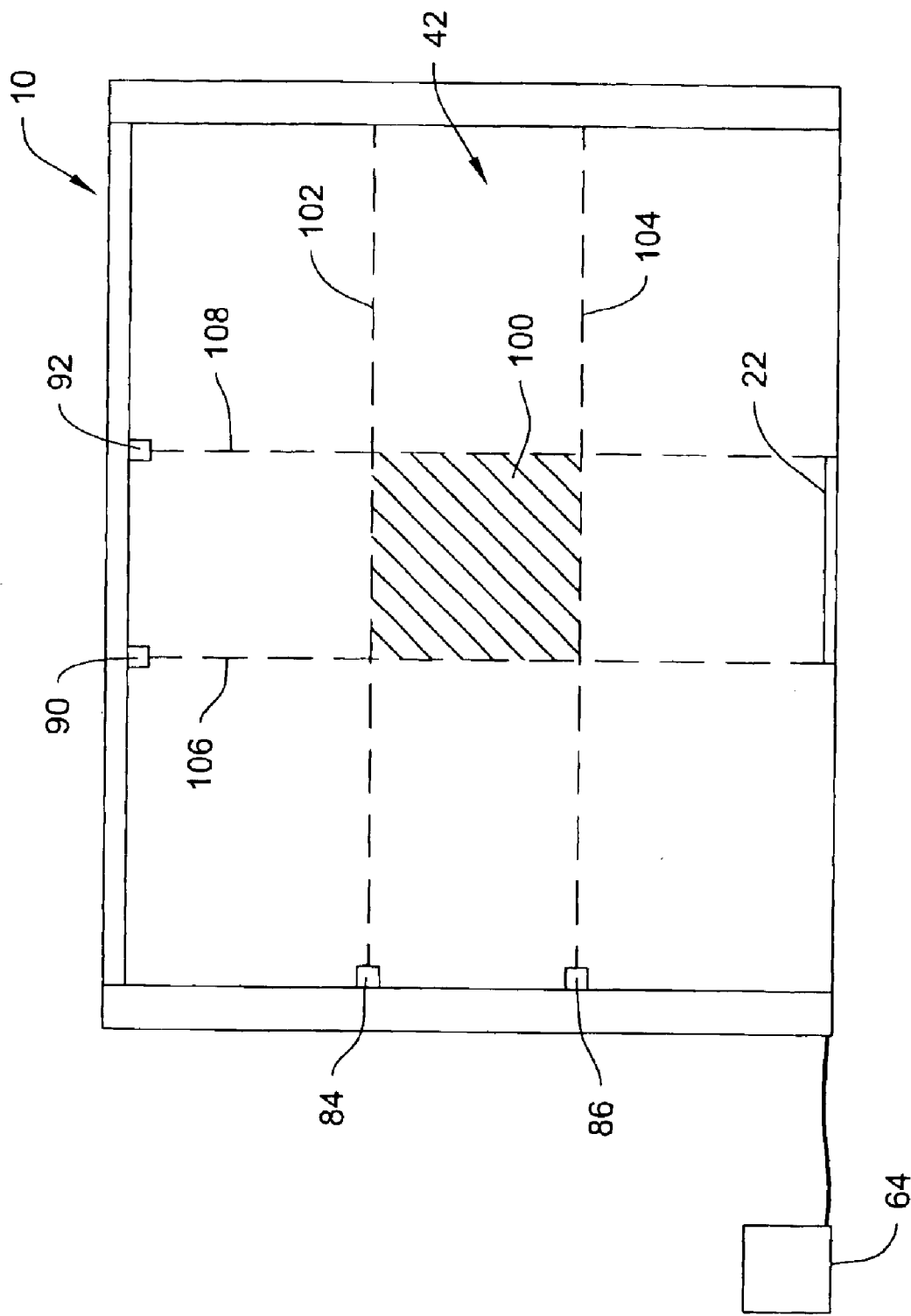
FIG. 7 is a front view of the pitch speed measurement and strike zone detection device of FIG. 1, showing the strike zone boundaries defined by the third and fourth light sources.

FIG. 7 is a front view of device 10, showing the location of the strike zone plane 100 formed by the third and fourth light sources 84,90. As illustrated in FIG. 7, the third light source and receiver 84,86 together form a light curtain defining the upper boundary 102 and lower boundary 104 of the strike zone plane 100. In similar fashion, the fourth light source and receiver 90,92 together form a vertical light curtain defining the left boundary 106 and right boundary 108 of the strike zone plane 100. The third and fourth light sources 84,90 can be configured to output a signal (e.g. via programmable computer 64) when object 44 passes through opening 42 between the areas defined by the upper and lower boundaries 102,104, and the left and right boundaries 106, 108, indicating that a "strike" ball has been thrown. Conversely, if the thrown object 44 fails to trip both circuits as it passes through opening 42, device 10 can be configured to indicate that a "ball" was thrown.

Figure 8:
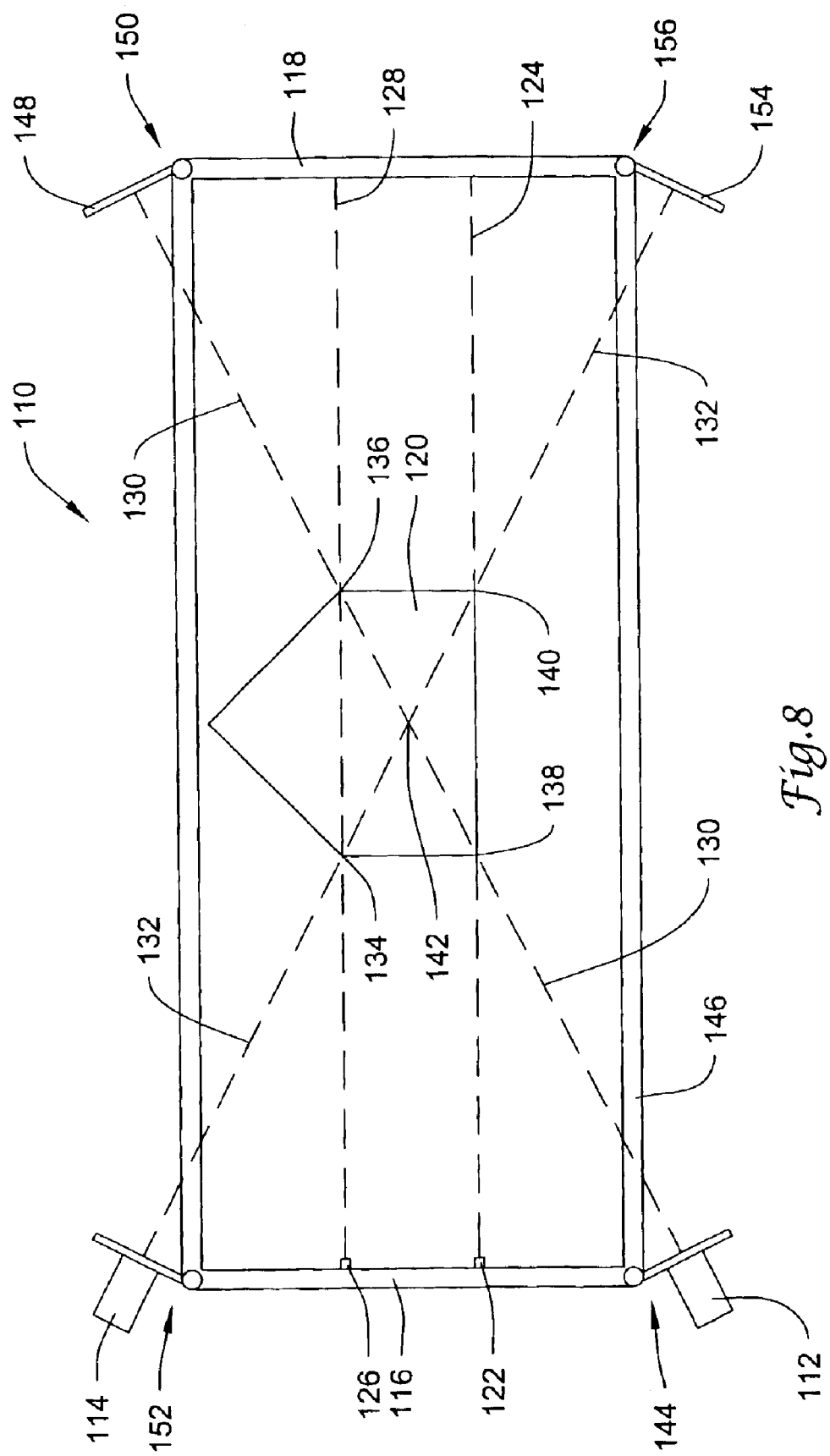
FIG. 8 is a top view of a pitch speed measurement and strike zone detection device in accordance with another exemplary embodiment of the present invention.

FIG. 8 is a top view of a pitch speed measurement and strike zone detection device 110 in accordance with another exemplary embodiment of the present invention. Device 110 is similar to the embodiment of FIG. 1, but includes an alternative set of light sources 112,114 configured to measure the precise location at which a thrown object is to the left or right of the strike zone. As shown in FIG. 8, device 110 may include a set of reflective surfaces 116,118 spaced apart from each other on either side of home plate 120. A first light source 122 coupled to one of the reflective surfaces 116 is configured to emit a light beam back and forth towards the opposite reflective surface 118, forming a first light curtain 124 proximal home plate 120. A second light source 126 coupled to one of the reflective surfaces 116 may be similarly configured to emit a second light beam back and forth towards the opposite reflective surface 118, forming a second light curtain 128 distal home plate 120.

The device 110 may further include a third and fourth light source 112,114 forming, respectively, third and fourth intersecting light curtains 130,132. As shown in FIG. 8, the third and fourth light curtains 130,132 are configured geometrically to cross at the four edges 134,136,138,140 of home plate 120, intersecting at location 142 at or near the centerline of home plate 120. In the exemplary embodiment of FIG. 8, the third light source 112 is shown coupled to the left-front portion 144 of support frame 146, and is configured to direct light back and forth between a reflective surface 148 coupled to the right-rear portion 150 of the support frame 146. The second light source 114, in turn, can be coupled to the left-rear portion 152 of the support frame 146, and is configured to direct light back and forth between another reflective surface 154 coupled to the right-front portion 156 of the support frame 146. It should be understood, however, that other arrangements or modifications could be made in accordance with the present invention.

The various light sources 112,114,122,126 may each be optically coupled to a corresponding receiver (e.g. a photo-sensitive detector) that detects when the object passes through the light beam, triggering a circuit within a logic device such as a programmable computer. Each light source can be pulsed at a relatively high rate and at differing intervals from the other light sources to prevent interference with the various intersecting light curtains from occurring.

In use, the location of the thrown object can be determined by the order in which the various light curtains are triggered. Table 1 reproduced below illustrates the location and associated call (i.e. "strike" or "ball") corresponding to objects thrown through various locations within the target area.

TABLE 1

| Light Curtain Triggering Order | Location Within Target Area | Call |
| --- | --- | --- |
| First Third Fourth | Left Side of Home Plate | Strike |
| First Fourth Third | Right Side of Home Plate | Strike |
| First Third & Fourth | Centerline of Home Plate | Strike |
| First and Third Fourth | Left Border of Home Plate | Strike |
| First and Fourth Third | Right Border of Home Plate | Strike |
| Third First Fourth | Left Side of Home Plate | Ball |
| Fourth First Third | Right Side of Home Plate | Ball |
| None (timeout) | Out of Target Area | Ball |

For example, as can be seen from Table 1 above, if the thrown object triggers, in order, the first, third and fourth light curtains, device 110 can be configured to alert the pitcher that the ball thrown was a "strike" located to the left of home plate. By way of another example, if the object first triggers the first light curtain, followed by the third and fourth light curtains simultaneously, device 110 may indicate that a "strike" ball was thrown through the centerline of home plate.

In certain embodiments, the precise location that the object is thrown may be determined using the order and time in which the various light curtains are triggered, and the speed at which the object passes through the target area. For example, in the exemplary embodiment of FIG. 8, the first and second light curtains 122,126 can be used to measure the speed at which the object passes within the target region. From this determination, device 110 can be configured to compute the precise location (i.e. left or right) of the object by measuring the time required for the object to trigger the third and fourth light curtains 130,132, and then, by using the geometric relationship of the various intersecting light curtains, compute the distance at which the object is located away from the center 142.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. Apparatus for determining the speed of a moving object, comprising:
   a pair of reflective surfaces spaced apart from each other on opposite sides of a target area;
   first optical means for generating a first light curtain at a proximal region of the target area, said first light curtain formed by a single light beam emitted from said first optical means;
   second optical means for generating a second light curtain at a distal region of the target area, said second light curtain formed by a single light beam emitted from said second optical means; and calculating means for determining the velocity of the moving object as the object passes between the first and second light curtains.

2. The apparatus of claim 1, wherein each reflective surface comprises a mirror.

3. The apparatus of claim 1, wherein each of said first and second optical mean comprises a light source and a receiver.

4. The apparatus of claim 3, wherein said light source is a laser.

5. The apparatus of claim 3, wherein said receiver is a photosensitive detector.

6. The apparatus of claim 1, further comprising a support frame coupled to said pair of reflective surfaces.

7. The apparatus of claim 6, wherein the support frame includes a base structure and a plurality of vertical uprights.

8. The apparatus of claim 7, further including a mounting post for releasably connecting the base structure to the plurality of vertical uprights.

9. The apparatus of claim 1, further including a self-alignment laser and one or more photosensitive detectors configured to measure the alignment of said pair of reflective surfaces.

10. The apparatus of claim 1, further comprising an adjustment mechanism for adjusting said pair of reflective surfaces.

11. The apparatus of claim 10, wherein said adjustment mechanism includes horizontal and vertical adjustment mechanisms for adjusting, respectively, the horizontal and vertical alignment of said pair of reflective surfaces.

12. The apparatus of claim 1, further including means for detecting whether the moving object passes through a strike zone within the target area.

13. The apparatus of claim 12, wherein said means for detecting whether the moving object passes through a strike zone includes a third and fourth light source each optically coupled to a receiver.

14. The apparatus of claim 13, wherein said third and fourth light sources are configured to measure the location of the object within the strike zone.

15. The apparatus of claim 1, wherein said calculating means comprises a programmable computer.

16. Apparatus for determining the speed of a moving object, comprising:
- a pair of reflective surfaces spaced apart from each other on opposite sides of a target area;
- a first light source and receiver forming a first light curtain at a proximal region of the target area, said first light curtain formed by a single light beam emitted from said first light source;
- a second light source and receiver forming a second light curtain at a distal region of the target area, said second light curtain formed by a single light beam emitted from said second light source; and
- calculating means for determining the velocity of the moving object as the object passes between the first and second light curtains.

17. The apparatus of claim 16, wherein each reflective surface comprises a mirror.

18. The apparatus of claim 16, wherein each of said first and second light sources includes a laser.

19. The apparatus of claim 16, wherein each of said first and second receivers is a photosensitive detector.

20. The apparatus of claim 16, further comprising a support frame coupled to said pair of reflective surfaces.

21. The apparatus of claim 20, wherein the support frame includes a base structure and a plurality of vertical uprights.

22. The apparatus of claim 21, further including a mounting post for releasably connecting the base structure to the plurality of vertical uprights.

23. The apparatus of claim 16, further including a self-alignment laser and one or more photosensitive detectors configured to measure the alignment of said pair of reflective surfaces.

24. The apparatus of claim 16, further comprising an adjustment mechanism for adjusting said pair of reflective surfaces.

25. The apparatus of claim 24, wherein said adjustment mechanism includes horizontal and vertical adjustment mechanisms for adjusting, respectively, the horizontal and vertical alignment of said pair of reflective surfaces.

26. The apparatus of claim 16, further including means for detecting whether the moving object passes through a strike zone within the target area.

27. The apparatus of claim 26, wherein said means for detecting whether the moving object passes through a strike zone includes a third and fourth light source each optically coupled to a receiver.

28. The apparatus of claim 27, wherein said third and fourth light sources are configured to measure the location of the object within the strike zone.

29. The apparatus of claim 16, wherein said calculating means comprises a programmable computer.

30. Apparatus for determining the speed of a moving object, comprising:
- a pair of reflective surfaces spaced apart from each other on opposite sides of a target area;
- a first laser source and photosensitive detector forming a first light curtain at a proximal region of the target area, said first light curtain formed by a single laser beam emitted from said first laser source;
- a second laser source and photosensitive detector forming a second light curtain at a distal region of the target area, said second light curtain formed by a single laser beam emitted from said second laser source; and
- calculating means for determining the velocity of the moving object as the object passes between the first and second light curtains.

31. Apparatus for determining the speed of a moving object, comprising:
- a pair of reflective surfaces spaced apart from each other on opposite sides of a target area;
- a support frame coupled to said pair of reflective surfaces, the support frame including a base structure and a plurality of vertical uprights;
- a first light source and receiver forming a first light curtain at a proximal region of the target area, said first light curtain formed by a single light beam emitted from maid first light source;
- a second light source and receiver forming a second light curtain at a distal region of the target area, said second light curtain formed by a single light beam emitted from said second light source; and
- calculating means for determining the velocity of the moving object as the object passes between the first and second light curtains.

32. Apparatus for determining the speed and location of a moving object, comprising:
- a pair of reflective surfaces spaced apart from each other on opposite sides of a target area;

first optical means for generating a first light curtain at a proximal region of the target area, said first light curtain formed by a single light beam emitted from said first optical means;

second optical means for generating a second light curtain at a distal region of the target are, said second light curtain formed by a single light beam emitted from said second optical means;

third optical means for detecting whether the moving object passes through a strike zone within the target area; and calculating means for determining the velocity and location of the moving object as the object passes between the first and second light curtains.

33. The apparatus of claim 32, wherein said third optical means for detecting whether the moving object passes through a strike zone includes a third and fourth light source each optically coupled to a receiver.

34. The apparatus of claim 33, wherein said third and fourth light sources are configured to measure the location of the object within the mike zone.

35. A method of determining the speed of a moving object, comprising the steps of:

providing a pair of reflective surfaces spaced apart from each other on opposite sides of a target area defining a proximal region and a distal region;

forming a first light curtain between the reflective surfaces at the proximal region of said target area, said first light curtain formed by a single light beam emitted from a first light source;

forming a second light curtain between the reflective surfaces at the distal region of said target area, said second light curtain formed by a single light beam emitted from a second light source;

measuring the differential time required for the moving object to trigger the first and second light curtains; and calculating the speed of the moving object.

36. The method of claim 35, wherein the step of calculating the speed of the moving object comprises the step of dividing the differential time required to trigger the first and second light curtains by a value representing the distance between the first and second light curtains.

37. A method of determining the location of a moving object within a strike zone, comprising the steps of:

providing a first light source and receiver defining a vertical boundary within a target area;

providing a second light source and receiver defining a horizontal boundary within a target area;

emitting a first light beam from the first light source back and forth between a first set of reflective surfaces to form a first light curtain;

emitting a second light beam from the second light source back and forth between a second set of reflective surfaces to form a second light curtain;

determining whether the moving object passes through the strike zone by measuring whether the thrown object triggers the first or second light curtains.

38. The method of claim 37, wherein the first and second light sources are configured geometrically to provide a measure of position within the target area.

* * * * *

UNITED STATES PATENT AND TRADEMARK OFFICE
CERTIFICATE OF CORRECTION

PATENT NO.       : 6,985,206 B2
APPLICATION NO.  : 10/452532
DATED            : January 10, 2006
INVENTOR(S)      : James R. Anderson et al.

It is certified that error appears in the above-identified patent and that said Letters Patent is hereby corrected as shown below:

Claim 31, line 55, delete "maid", and add --said--

Claim 32, line 6, delete "are", and add --area--

Claim 34, line 21, delete "milk", and add --strike--

Signed and Sealed this

Twenty-sixth Day of December, 2006

JON W. DUDAS
*Director of the United States Patent and Trademark Office*